(12) United States Patent
Phillips

(10) Patent No.: US 7,677,348 B1
(45) Date of Patent: Mar. 16, 2010

(54) APPARATUS FOR DETERING INSTABILITY OF A MOTORCYCLE

(75) Inventor: Wilbert Hulon Phillips, Los Angeles, CA (US)

(73) Assignee: Spirit America, Inc., North Hollywood, CA (US)

( * ) Notice: Subject to any disclaimer, the term of this patent is extended or adjusted under 35 U.S.C. 154(b) by 411 days.

(21) Appl. No.: 10/978,265

(22) Filed: Oct. 30, 2004

Related U.S. Application Data

(60) Provisional application No. 60/516,670, filed on Oct. 30, 2003.

(51) Int. Cl.
*B62K 11/00* (2006.01)
(52) U.S. Cl. .................................... 180/228

(58) Field of Classification Search ................. 180/228; 248/284.1, 282.1, 200, 300, 283.1
See application file for complete search history.

(56) References Cited

U.S. PATENT DOCUMENTS

| | | | | |
|---|---|---|---|---|
| 4,776,423 A | * | 10/1988 | Buell | 180/228 |
| 6,213,240 B1 | * | 4/2001 | Buell | 180/228 |
| 2002/0066611 A1 | * | 6/2002 | Lane et al. | 180/228 |

* cited by examiner

*Primary Examiner*—Kevin Hurley
(74) *Attorney, Agent, or Firm*—J. David Nelson

(57) ABSTRACT

An apparatus for deterring instability of a motorcycle comprising: a support member; a stabilizer link communicating with the support member, and a frame bracket communicating with the stabilizer, wherein the stabilizer link maintains a substantially constant positional relationship between the support member and the frame bracket.

7 Claims, 7 Drawing Sheets

APPARATUS FOR DETERING INSTABILITY OF A MOTORCYCLE

RELATED APPLICATIONS

This invention is disclosed in my provisional Patent Application Ser. No. 60/516,670, filed Oct. 30, 2003 by the inventor.

FIELD OF INVENTION

This invention relates generally to motorcycles, and more particularly, but not by way of limitation, to prevent suspension instability.

BACKGROUND

Motorcycles that have an engine, a transmission mounted rigidly to a single frame as a rigid member produce extreme vibration resulting in both frame and rider fatigue. In order to eliminate fatigue; manufactures like Harley-Davidson and others produce motorcycles that mount a rear suspension arm pivotally connected to a pivot member on a transmission assembly; the transmission assembly is connected to a engine to form a separate rigid power train unit; which is attached to a main frame through soft elastomeric mounts; the power train unit is interconnected by one or two stabilizer links to portions of the motorcycle; permitting movement in a vertical plane. These arrangements have reduced vibration input to the main frame and the rider; while maintaining integrity of the power train unit during transmission of driving forces between the engine and a rear wheel.

However, these designs have affected handling characteristics of the motorcycle due to the elastic connections between the power train unit and the main frame. Both the handling characteristic and the operating stability of the motorcycle are compromised, relative to a motorcycle configured with a single rigid frame. Because the soft elastomeric mounts: facilitate vertical movement of the power train unit relative to the main frame; and accommodate lateral deflection of the rear suspension arm in the horizontal plane; this results in weaving and wobbling; especially on long sweeping turns; which can be life threatening. This condition exists because the power train unit is interconnected with a portion of the motorcycle with less than three stabilizer links; less than three tie rods; less than three tie links; and therefore not anchored in the horizontal plane.

Motorcycle manufacturers do produce motorcycles with vibration isolation that interconnect the engine power train unit in respect to the main frame exemplified by U.S. Pat. No. 4,776,423 issued to Buell et al, (Buell '423). Buell '423 teaches a plurality of at least three tie rods interconnecting the engine and the power train unit with the main frame to mitigate lateral motion of the rear suspension arm in the horizontal plane. However, Buell '423 does not teach or suggest a solution to retrofit those motorcycles manufactured that have a power train unit interconnecting to the main frame with less than three tie rods.

A second exemplification in U.S. Pat. No. 6,213,240 issued to Buell et al (Buell '240). Buell '240 teaches at least three tie links interconnecting the engine and transmission assembly with the main frame to mitigate lateral motion of the rear suspension arm in the horizontal plane. However, Buell '240 does not teach a solution to retrofit those motorcycles manufactured that have less than three tie links interconnecting, the power train unit to the main frame.

Thus, challenges remain and needs persist to provide an apparatus for deterring the dangerous and life threatening instability of the motorcycles, manufactured with vibration isolation that have less than three stabilizer links interconnecting the power train unit (first portion of the motorcycle); to the main frame (second portion of the motorcycle) to prevent lateral movement.

SUMMARY OF THE INVENTION

An embodiment of the present invention provides an apparatus to deter instability; by laterally anchoring the power train unit (first portion of the motorcycle) with the addition of a third stabilizer link to vibration isolated motorcycles manufactured with less than three stabilizer links; still allowing movement in the vertical plane; including a support member; a stabilizer link communicating with the support member; and a frame bracket communicating with the stabilizer, wherein the stabilizer link maintains a substantially constant positional relationship between the support member and the frame bracket; cooperate to deter instability of the motorcycle.

DETAILED DESCRIPTION OF THE PREFERRED EMBODIMENT

Figure 1:
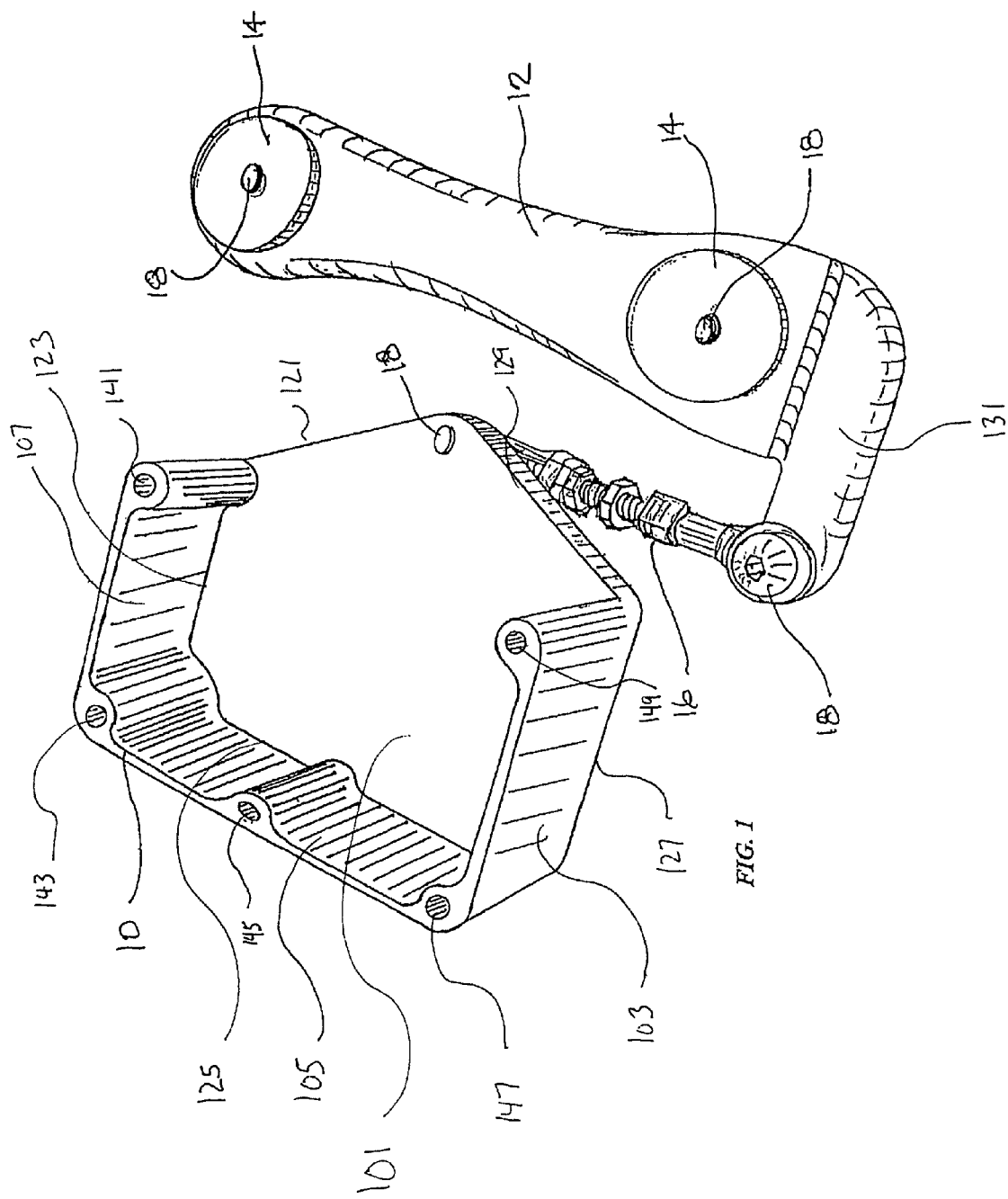
FIG. 1 is an elevated side view of a apparatus constructed in accordance with a preferred embodiment of the present invention.

An embodiment of the apparatus is built by steps that include providing a rectangular aluminum material stock 7.5 cm×18 cm×40 cm for use in producing a component part 10 of the apparatus; separating each component part 12 and 14 of the apparatus from the material stock; collecting and pre-staging select component parts into an assembly kit specific to a motorcycle model; machine the material stock configuring the support bracket 10 to engage with a first portion of the motorcycle; apertures are machined in the configured support bracket 10 to attach the support bracket to the first portion of the motorcycle; the frame bracket 12 is machined from the material stock to a variable predetermined shape to correspond with a specific motorcycle model; so to engage with a second portion of the motorcycle; the frame bracket 12 is counter bored with two settling pockets 3.8 cm×12 mm deep to accommodate attachments 14 and engage to a second portion of the motorcycle; the attachments 14 are lathed and threaded ⅜-16 to engage with the frame bracket into the settling pockets and secured with bolts 18; the machined components are protectively sealed; then placing each component part onto a assembly fixture; corresponding to the motorcycle model; and attach the stabilizer link 16 to the support member and to the frame bracket 12 to form the apparatus. The method of manufacturing by machining is purely for immediate access to the market place; but does not excluded nor limit: die casting, fabricating, forging; extrusion, orbital forging, impact extrusion, investment casting, rubber plaster mold, sand casting, spin cast, and vacuum cast.

These and various other features and advantages, which characterize the present invention, will be apparent from a reading of the following detailed description and a review of the associated drawings.

| DRAWINGS-Reference Numerals | | | |
|---|---|---|---|
| 10 | Support Member | 12 | Frame Bracket |
| 14 | Nut | 16 | Stabilizer |
| 18 | Bolt | 20 | Power train |
| 22 | Main frame | | |

Referring to the drawings in general, and more particularly to FIG. 1, shown therein is an elevational side view of a support bracket 10 constructed in accordance with the embodiment of the present invention. The support bracket 10 configuration depends on the power train unit 20 of the model the vibration isolated motorcycle is constructed to serve. The support bracket includes a horizontal member 101 and three vertical members 103, 105, and 107. The horizontal member has a plurality of ends 121, 123, 125, 127, and 129. Each of the vertical members 103, 105, and 107 is attached to a separate end of the horizontal member. For example, vertical member 103 is attached to end 127; vertical member 105 is attached to end 125; vertical member 107 is attached to end 123. The support bracket 10 is configured to engage four corresponding surfaces on the power train unit. For example, the vertical members may include a plurality of mounting apertures 141, 143, 145, 147, and 149. The stabilizer link 16 is pivotally connected to the horizontal member to communicate with the main frame bracket 12 at an end of an elongated brace 131 and is adjusted to align the mounting apertures of the support member 10 during installation with the main frame bracket 12. The nuts 14 secure the main frame bracket 12 to the frame 22 with the bolts 18; between the support member 10 and the main frame bracket 12. The power train unit 20 is now anchored to the main frame 22 in the horizontal plane but can still move vertically.

Figure 2:
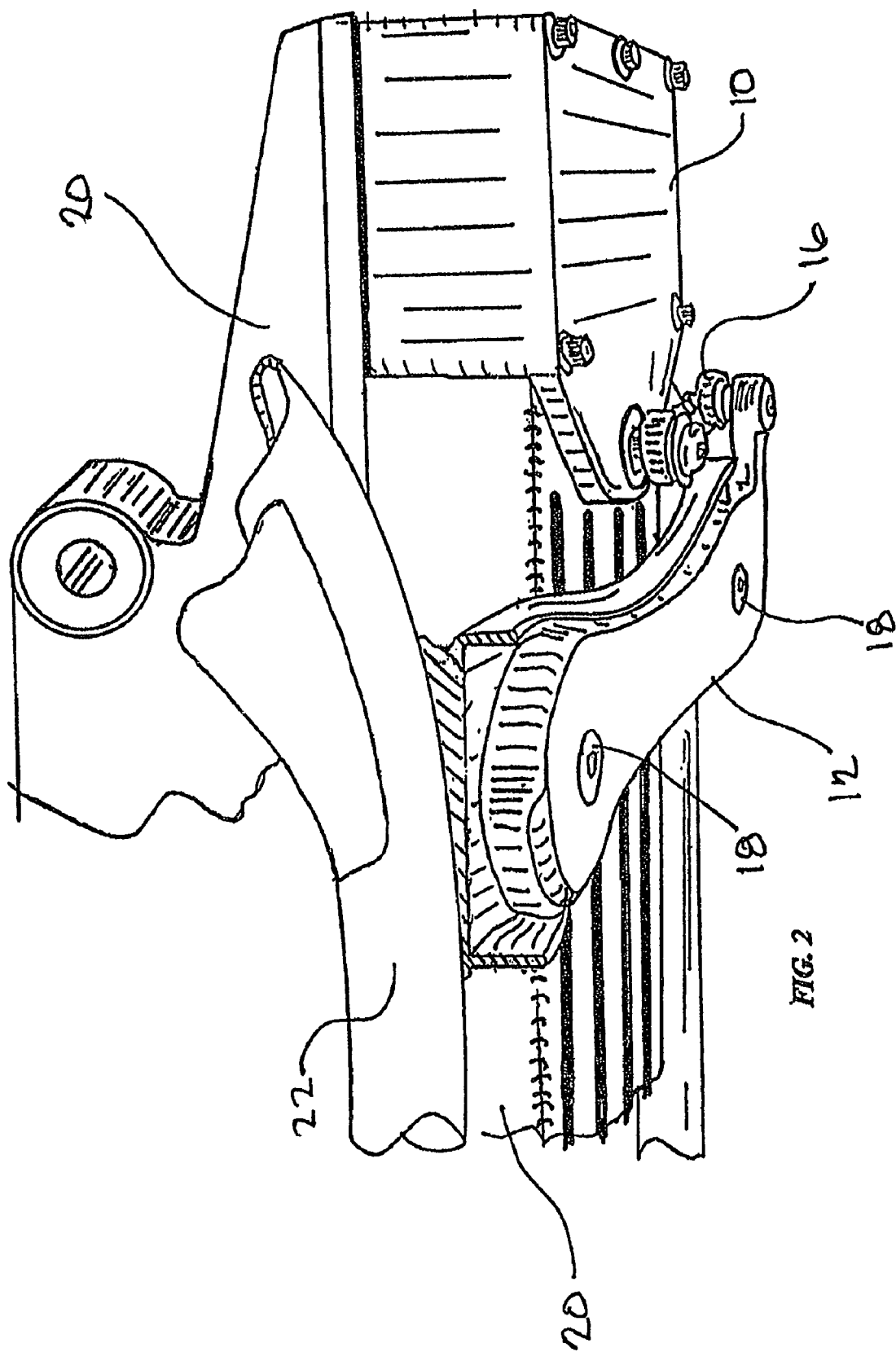
FIG. 2 is a left side view of the apparatus of FIG. 1.

FIG. 2 is a left side bottom view of the apparatus showing the support bracket 10 attached to the power train unit 20 communicating with the stabilizer link 16 connected to the frame bracket 12 secured to the main frame by the bolt 18.

Figure 3:
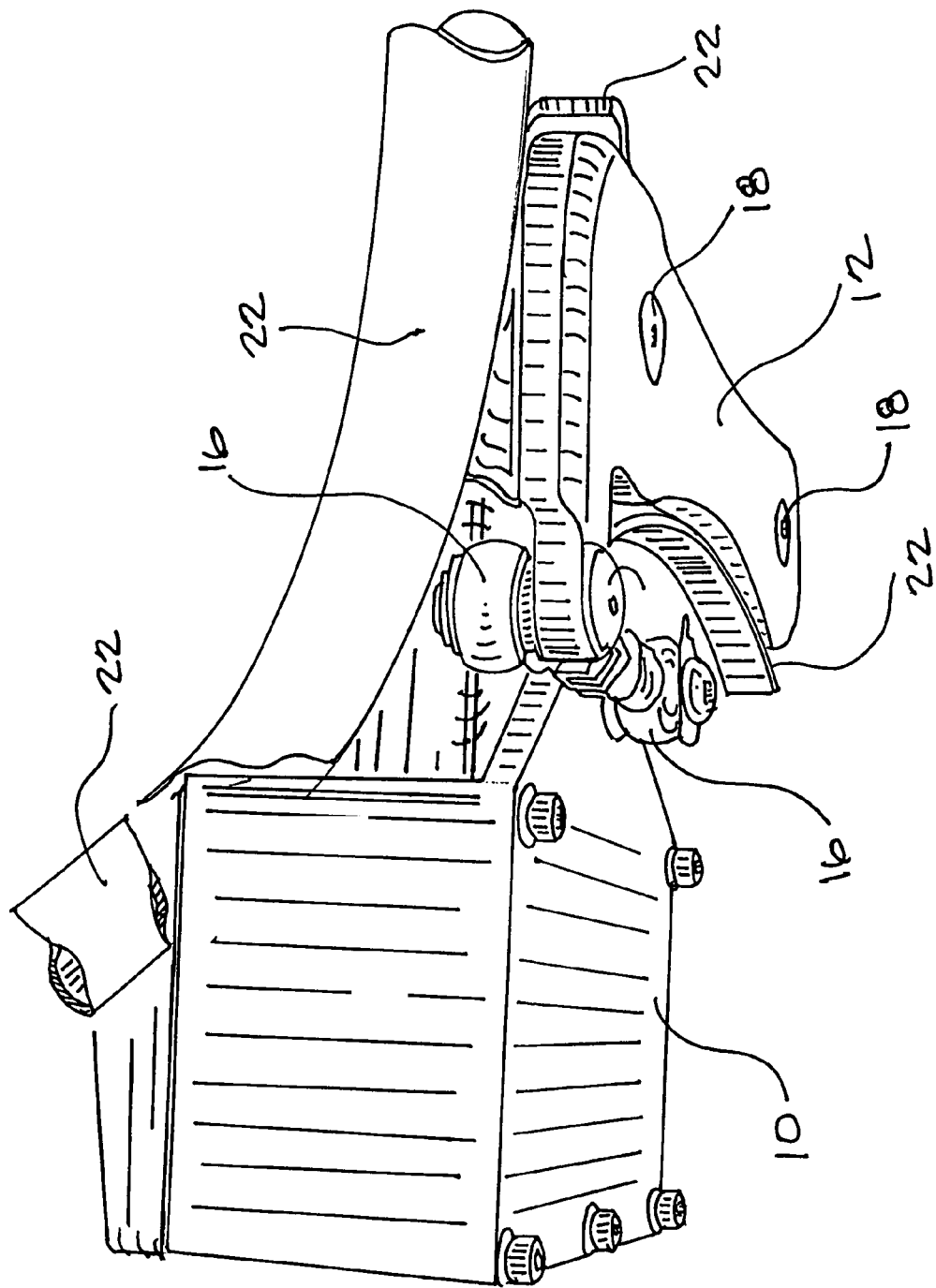
FIG. 3 is a right side view of the apparatus of FIG. 1.

FIG. 3 is a right side bottom view of the apparatus support bracket 10 attached to the power train unit 20 communicating with the stabilizer link 16 connected to the frame bracket 12 secured to the main frame 22.

Figure 4:
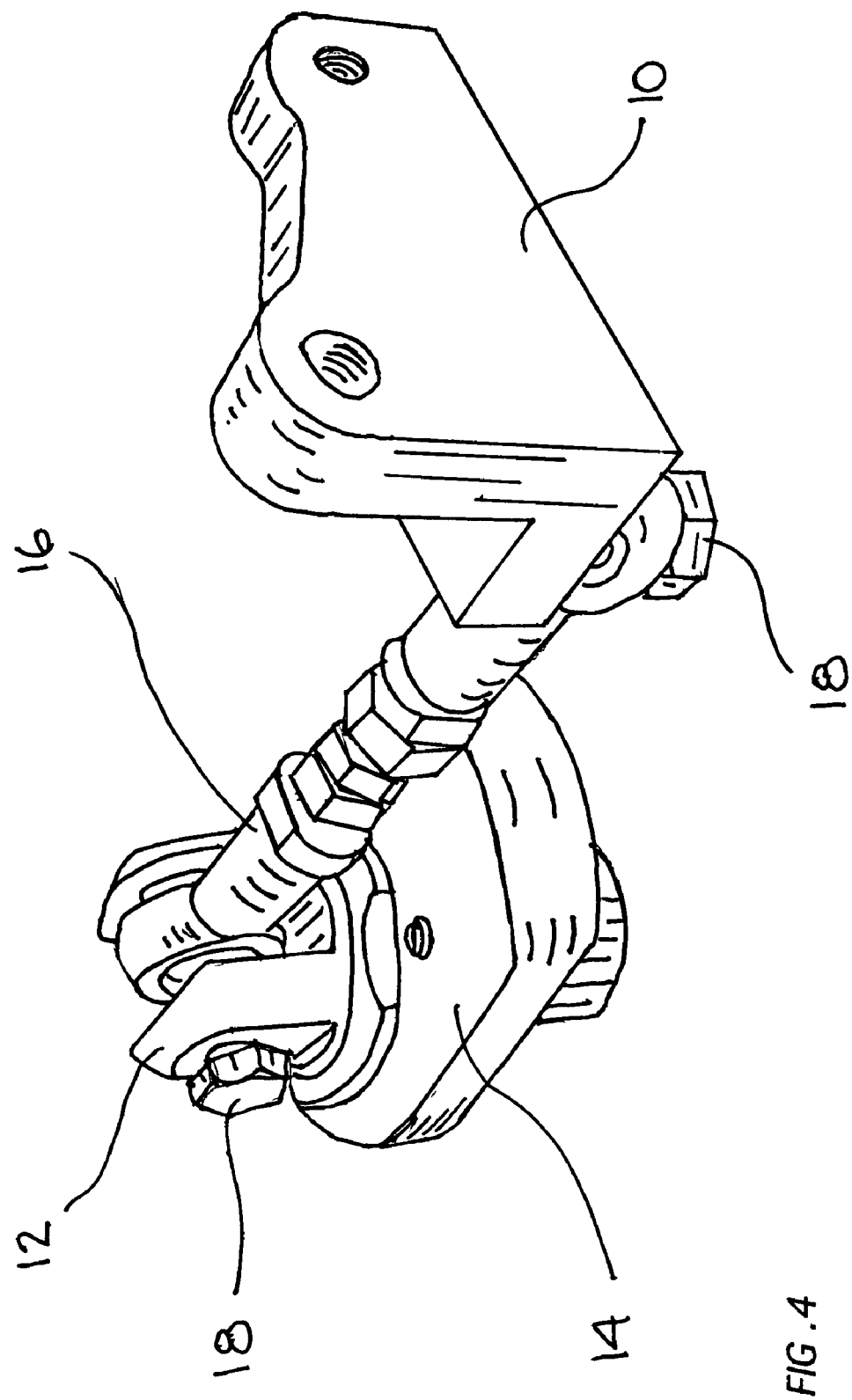
FIG. 4 is a perspective view of another embodiment of the invention.
Figure 5:
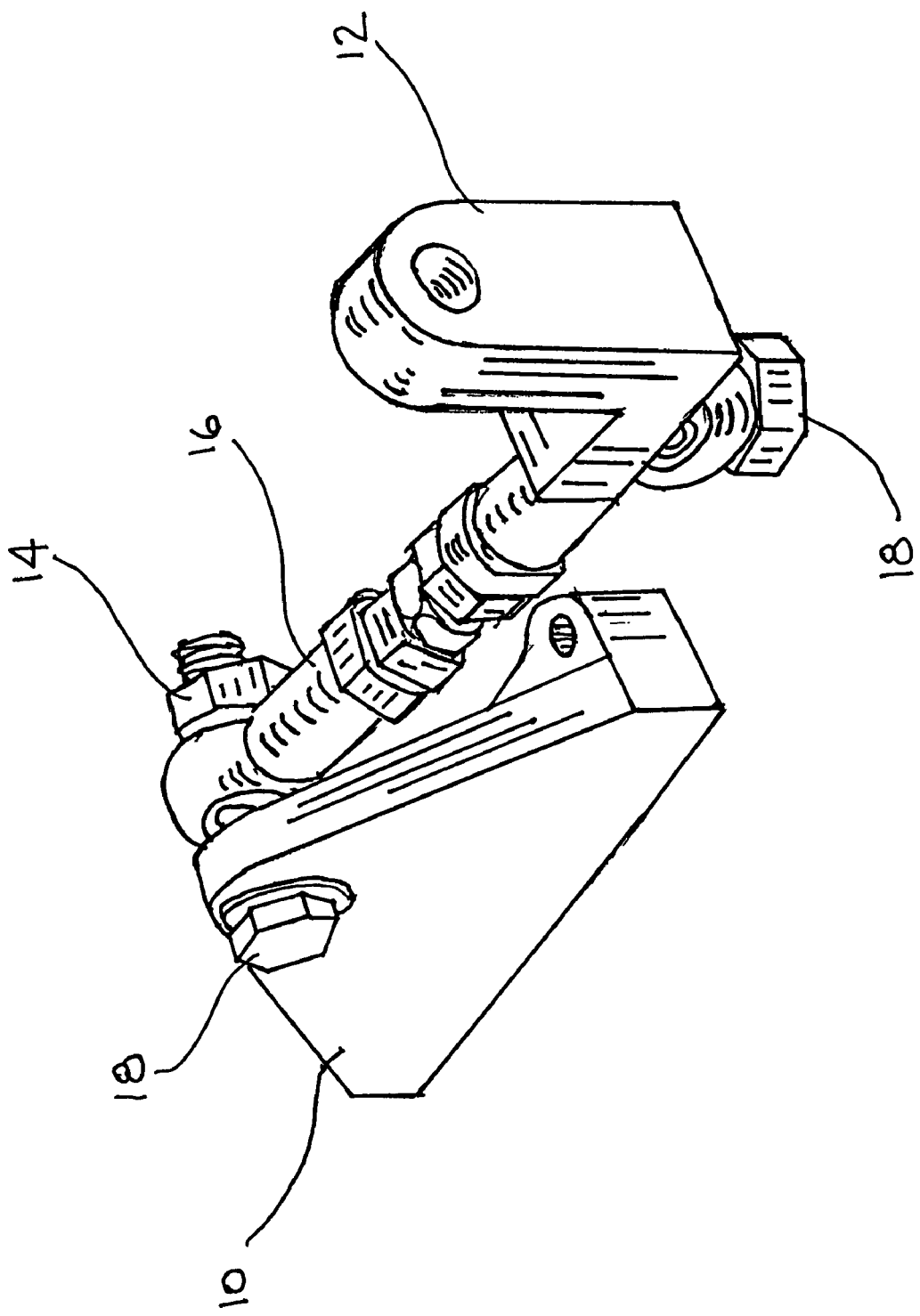
FIG. 5 is a perspective view of another embodiment of the invention.
Figure 6:
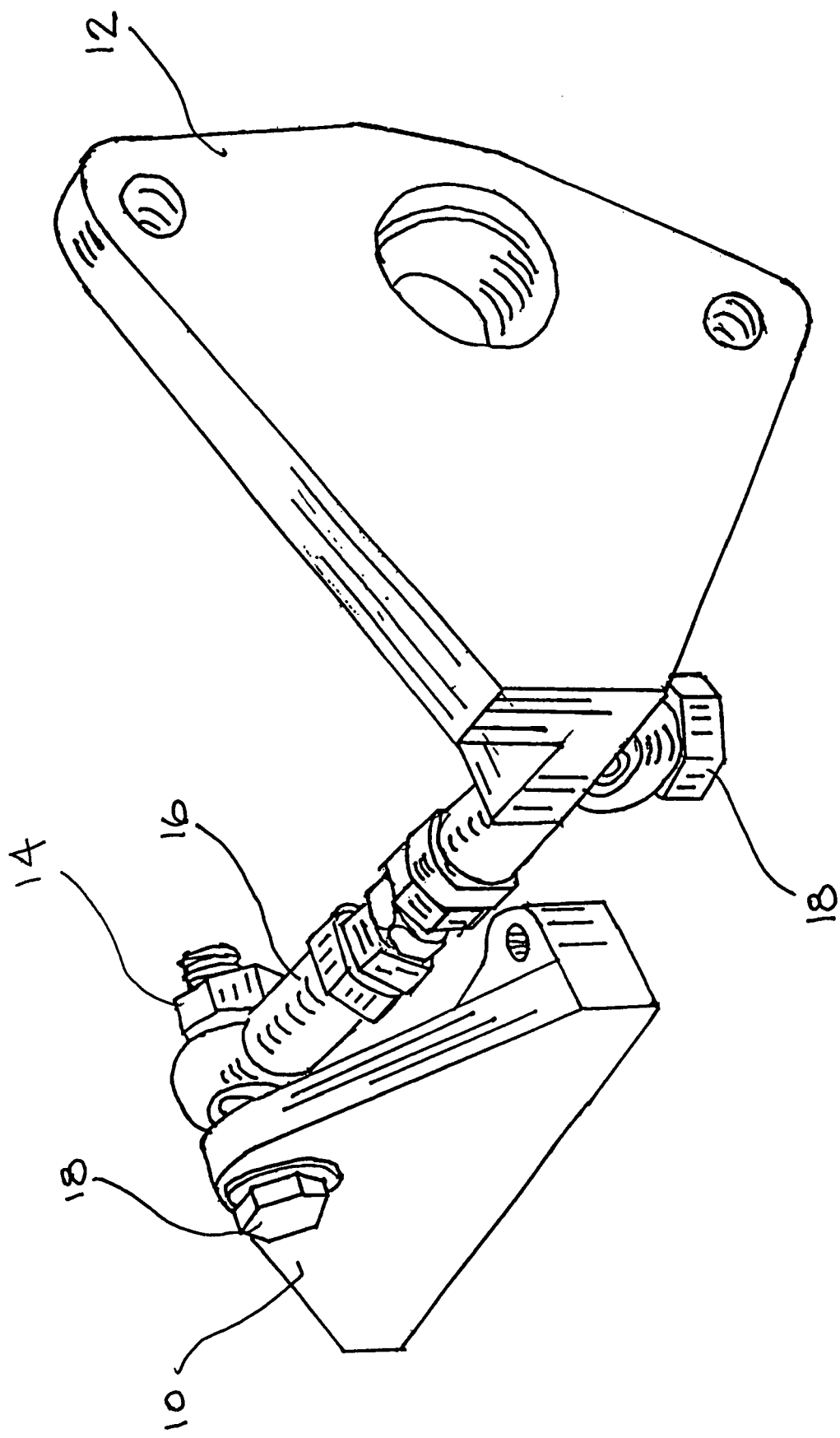
FIG. 6 is a perspective view of another embodiment of the invention.
Figure 7:
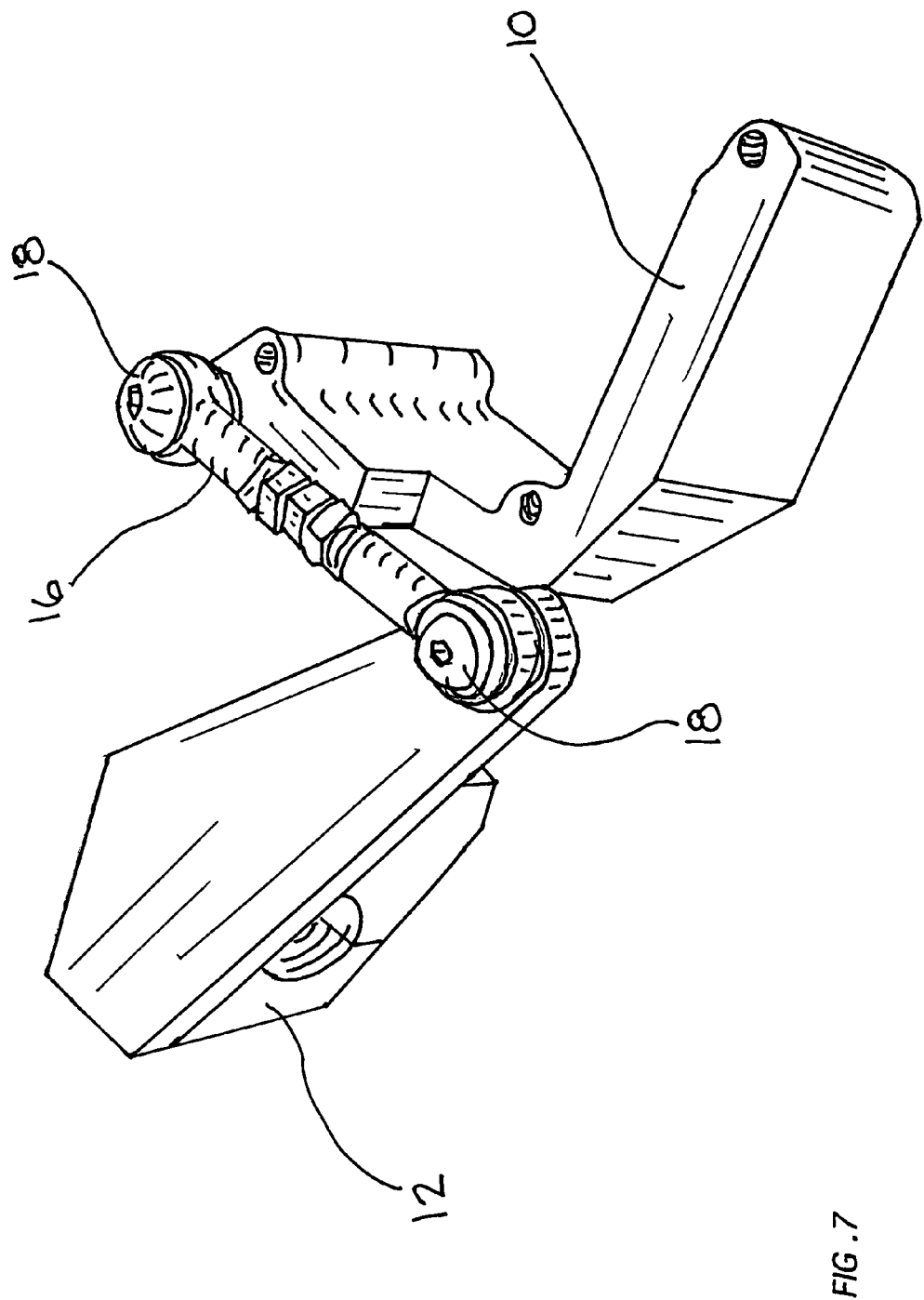
FIG. 7 is a perspective view of another embodiment of the invention.

It is to be understood that even though numerous characteristics and advantages of various embodiment of the present invention have been set forth in the foregoing description, together with details of the structure and function of various embodiment of the invention, this disclosure is illustrative only, and changes may be made in detail, especially in matters of structure and arrangement of parts within the principles of the present invention to the full extent indicated by the expressed examples as shown in:

For example FIG. 4;
For example FIG. 5;
For example FIG. 6; and
For example FIG. 7.

What is claimed is:

1. An apparatus for deterring instability of a vibration isolated motorcycle having a power train unit attached to a frame by less than three stabilizer links comprising:
   a support bracket having a horizontal member and three vertical members, wherein the horizontal member has a plurality of ends and each vertical member is attached to a separate end of the horizontal member, the support bracket being configured to engage four corresponding surfaces on the power train unit;
   a stabilizer link pivotally connected to the horizontal member of the support bracket proximal to an end of the horizontal member; and
   a frame bracket pivotally connected with the stabilizer link wherein the frame bracket comprises an elongated brace having a plurality of attachment points configured to engage the frame.

2. The apparatus of claim 1, wherein the support bracket comprises a plurality of mounting apertures in the three vertical members, the support bracket being configured to engage the power train of the motorcycle, and wherein the brace is configured to engage the frame on at least three surfaces.

3. The apparatus of claim 2, wherein the stabilizer link may be adjusted to align the mounting apertures of the support bracket to the power train during installation of the frame bracket to the frame such that the support bracket, the stabilizer link and the frame bracket cooperate to deter instability of the motorcycle.

4. The apparatus of claim 1, further comprising elastomeric mounts at the plurality of attachment points.

5. An apparatus for deterring instability of a vibration isolated motorcycle having a power train unit attached to a main frame by less than three stabilizer links comprising:
   a support bracket having a plurality of apertures, a plurality of ends, and at least one surface wherein the surface is configured to engage the power train;
   a stabilizer link pivotally connected with the support bracket proximal to one end; and
   a frame bracket comprising a plurality of ends, wherein the frame bracket is pivotally connected with the stabilizer link at an end opposing the support bracket.

6. The apparatus of claim 5, wherein the frame bracket comprises a plurality of surfaces configured to engage the frame.

7. The apparatus of claim 6, wherein the frame bracket comprises a plurality of apertures configured to the frame.

* * * * *